United States Patent [19]

Okamoto et al.

[11] Patent Number: 5,441,831
[45] Date of Patent: Aug. 15, 1995

[54] CELLS HAVING CATHODES CONTAINING POLYCARBON DISULFIDE MATERIALS

[75] Inventors: Yoshi Okamoto, Fort Lee, N.J.; Terje A. Skotheim, Shoreham; Hung S. Lee, Rocky Point, both of N.Y.

[73] Assignee: Associated Universities, Inc., Washington, D.C.

[21] Appl. No.: 145,091

[22] Filed: Nov. 3, 1993

Related U.S. Application Data

[63] Continuation-in-part of Ser. No. 991,948, Dec. 17, 1992, abandoned.

[51] Int. Cl.⁶ .......................... H01B 1/10; H01B 1/12; H01M 4/60
[52] U.S. Cl. .................................... 429/213; 429/190; 429/104
[58] Field of Search .......................... 429/213

[56] References Cited

U.S. PATENT DOCUMENTS

| | | | |
|---|---|---|---|
| 4,048,392 | 9/1977 | Garoutte | 429/105 |
| 4,143,214 | 3/1979 | Chang et al. | 429/112 |
| 4,152,491 | 5/1979 | Chang et al. | 429/112 |
| 4,181,779 | 1/1980 | Teo | 429/199 |
| 4,184,013 | 1/1980 | Weddigen et al. | 429/104 |
| 4,258,109 | 3/1981 | Liang et al. | 429/191 |
| 4,375,427 | 3/1983 | Miller et al. | 252/512 |
| 4,556,617 | 12/1985 | Kruger | 429/196 |
| 4,576,697 | 3/1986 | Palmer | 429/218 |
| 4,664,991 | 5/1987 | Perichaud et al. | 429/194 |
| 4,833,048 | 5/1989 | Dejonghe et al. | 429/104 |
| 4,917,974 | 4/1990 | Dejonghe et al. | 429/104 |

OTHER PUBLICATIONS

Okamoto, et al., "The Structure and Properties of Poly(Carbon Dichalcogenides)", J. Macromol. Sci.--Chem., A25 (5–7), pp. 799–810, (1988).

*Primary Examiner*—David B. Springer
*Attorney, Agent, or Firm*—Margaret C. Bogosian

[57] ABSTRACT

The present invention relates to an electric current producing cell which contains an anode, a cathode having as a cathode-active material one or more carbon-sulfur compounds of the formula $(CS_x)_n$, in which x takes values from 1.2 to 2.3 and n is greater or equal to 2, and where the redox process does not involve polymerization and de-polymerization by forming and breaking S—S bonds in the polymer backbone. The cell also contains an electrolyte which is chemically inert with respect to the anode and the cathode.

16 Claims, 5 Drawing Sheets

POLY(CARBON DISULFIDE) STRUCTURES

CELLS HAVING CATHODES CONTAINING POLYCARBON DISULFIDE MATERIALS

This invention was made with government support under Contract No. DE-AC02-76CH00016, between the U.S. Department of Energy and Associated Universities, Inc. The government has certain rights in the invention.

RELATED APPLICATION

This application is a continuation-in-part of application Ser. No. 991,948 filed Dec. 17, 1992 now abandoned.

BACKGROUND OF THE INVENTION

This invention relates to thin film solid state electrochemical cells. More particularly, this invention relates to a novel positive electrode material having the formula $(CS_x)_n$ wherein x is from about 1.2 to about 2.3 and n is unspecified but at least greater or equal to 2.

Batteries are used in almost all consumer electronic products from flash lights to lap top computers. Over the years, considerable interest has been shown in developing high energy-density rechargeable batteries for many applications including electric vehicles. In this regard, thin film solid state batteries using the organo-sulfur cathode materials of this invention are particularly well suited for use in many consumer applications because of their high energy to weight ratio.

Two main types of cathode materials used in the manufacture of thin film lithium and sodium batteries are known in the art. The first materials include transition metal chalcogenides, such as titanium disulfide with alkali metals as the anode. For example, among the cathode active chalcogenides, U.S. Pat. No. 4,049,879 lists transition metal phosphorous chalcogenides. Other U.S. patents, such as U.S. Pat. Nos. 4,143,214, 4,152,491 and 4,664,991 describes cells wherein the cathode is a carbon/sulfur based material, generally of the $C_xS$ formula where x is typically 10 or larger.

U.S. Pat. No. 4,143,294 to Chang, et al. describes cells having cathodes containing $C_xS$, wherein x is a numerical value from about 4 to about 50. U.S. Pat. No. 4,152,491 to Chang, et al. relates to electric current producing cells where the cathode-active materials include one or more polymer compounds having a plurality of carbon monosulfide units. The carbon monosulfide unit is generally described as $(CS)_x$, wherein x is an integer of at least 5, and may be at least 50, and is preferably at least 100. In both cells developed by Chang, et al. the energy storage capacity is limited because there is a low density of sulfur-sulfur bonds.

U.S. Pat. No. 4,664,991 to Perichaud, et al. describes a substance containing a one-dimensional electric conducting polymer and at least one polysulfurated chain forming a complex with the polymer. Perichaud, et al. use a material which has two components. One is the conducting polymer, which is selected from a group consisting of polyacetylenes, polyparaphenylenes, polythiophenes, polypyrroles, polyanilines and their substituted derivatives. The other is a polysulfurated chain which is in a charge transfer relation to the conducting polymer. The polysulfurated chain is formed by high temperature heating of sulfur to produce a chain of the composition . . . S—S—S—S . . . of indeterminate length. As a result of using this material, the cell of Perichaud, et at. exhibits a fairly low voltage of only 2.0 V against lithium.

In a related approach, U.S. Pat. Nos. 4,833,048 and 4,917,974 to De Jonghe, et al. describe a class of cathode materials made of organo-sulfur compounds of the formula $(R(S)_y)_n$ where y=1 to 6; n=2 to 20, and R is one or more different aliphatic or aromatic organic moieties having one to twenty carbon atoms. One or more oxygen, sulfur, nitrogen or fluorine atoms associated with the chain when R is an aliphatic chain can also be included. The aliphatic chain may be linear or branched, saturated or unsaturated. The aliphatic chain or the aromatic rings may have substituted groups. The preferred form of the cathode material is a simple dimer or $(RS)_2$. When the organic moiety R is a straight or a branched aliphatic chain, such moieties as alkyl, alkenyl, alkynyl, alkoxyalkyl, alkythioalkyl, or aminoalkyl group and their fluorine derivatives may be included. When the organic moiety comprises an aromatic group, the group may comprise an aryl, aralkyl or alkylaryl, including fluorine substituted derivatives, and the ring may also contain one or more nitrogen, sulfur, or oxygen heteroatoms in the ring as well.

In the cell developed by De Jonghe, et al. the main cathode reaction during discharge and recharge of the battery, is the breaking and reforming of S—S bonds. The breaking of an S—S bond is associated with the formation of an $S^-$-$M^+$ ionic complex. The organo-sulfur materials investigated by De Jonghe, et al. undergo polymerization and de-polymerization upon the formation and breaking of the S—S bonds. The de-polymerization which occurs during the discharging of the cell results in lower weight monomeric species which can dissolve into the electrolyte, severely reducing the utility of the organo-sulfur material as cathode-active material. The result is an unsatisfactory cycle life having a maximum of about 200 deep discharge-charge cycles, more typically less than 100 cycles as described in *J. Electrochem. Soc.*, Vol 138, pp. 1891–1895 (1991). In particular, the organo-sulfur materials developed by De Jonghe, et al., are highly unstable in the presence of high conductivity plasticized, or gel electrolytes.

A significant additional drawback with the organo-sulfur materials developed by De Jonghe, et al. is the slow kinetics of oxidation and reduction at ambient temperatures, severely reducing the power of cells incorporating cathodes made with the organo-sulfur materials as cathode-active materials. The slow kinetics is due to the oxidation and reduction being related to the formation and breaking of sulfur-sulfur bonds, respectively. In contrast, the organo-sulfur materials of the present invention are conjugated structures where the oxidation and reduction are independent of S—S bond formation and breaking and maintains a fast kinetic rate at ambient temperatures and below.

Despite the various approaches proposed for organo-sulfur cathode materials, there remains a need for an inexpensive cathode material having a high storage capacity, high discharge rate and a very long cycle life at ambient and sub-ambient temperatures.

It is, therefore, a primary object of this invention to provide new organo-sulfur based cathode materials for thin film solid state batteries which are inexpensive, yet avoid the limitations existing in the prior art, while offering performance characteristics much higher than those of known materials having an actual specific energy in excess of 900 Wh/kg.

It is another object of this invention to provide a new cathode having as the active cathode material poly(carbon disulfide) (PCS) polymers which does not undergo polymerization and de-polymerization upon oxidation and reduction.

It is yet another object of this invention to provide a method of making a solid state rechargeable battery including the novel cathode of the invention.

SUMMARY OF THE PRESENT INVENTION

The present invention provides a rechargeable, solid state electric current producing cell which contains:
(a) an anode which is one or more alkali or alkali earth metals and mixtures thereof, or intercalated carbon;
(b) a novel cathode having as the cathode active material one or more carbon-sulfur compounds having the formula $(CS_x)_n$ wherein x is from about 1.2 to about 2.3 and n is greater than 2, and preferably greater than 20; and
(c) a polymer electrolyte which is chemically inert with respect to the anode and the cathode and which permits the transportation of ions between the anode and the cathode.

The anode material may be an elemental alkali metal or an alloy including the mixture of an elemental alkali metal and ore or more alloys made from an element selected from the Periodic Table Group IA and IIA metals. Lithium and sodium are useful materials for the anode of the battery of the invention. The anode may also be intercalated carbon such as $LiC_x$ where x is equal to 6 or greater.

The cathode employed in the battery of the invention as the cathode active material is a poly(carbon disulfide) polymer having the formula $(CS_x)_n$, wherein x is from 1.2 to 2.3 and n is a numerical value greater than 2, and preferably greater than 20.

Two gel polymer electrolyte systems have been successfully used in the fabrication of the cell of the invention. One system is based on a sulfonated polyimide with propylene carbonate (PC) and ethylene carbonate (EC) as the plasticizer components; and the other a high conductivity gel polymer electrolyte based on polyacylonitrile (PAN) with EC and PC added.

A method of making the solid state battery of the invention is also provided. The method of making the cells of the present invention is particularly preferred for use in applications requiring long cycle life and high energy storage capacity.

As a result of the present invention, solid state batteries are provided having a longer cycle life, higher specific energy and higher current than has been previously achieved with organo-sulfur cathode materials. In addition these batteries also have long shelf life and a low rate of self-discharge.

For a better understanding of the present invention, reference is made to the following description and the accompanying drawings. The scope of this invention will be pointed out in the appended claims.

DETAILED DESCRIPTION OF THE INVENTION

The novel cell of the invention contains a specified anode, and a cathode which is a composite of a non-aqueous organic electrolyte, PCS and conductive carbon. The anode employed in the cell of the invention includes one or more metals selected from the group consisting of the Periodic Table Group IA and Group IIA metals. The anode may comprise any metal capable of functioning as a negative electrode in combination with the novel PCS cathode material of the invention. Preferably, however, the anode includes one or more alkali metals. The anode may also comprise one or more alkali metals in combination with one or more alkali earth metals, or in combination with one or more suitable metals. Most preferably, the anode comprises a thin lithium foil of a thickness from about 25 $\mu$m to about 250 $\mu$m.

The cathode employed in the cell of the present invention contains as its cathode active material a poly(carbon disulfide) (PCS) polymer having the formula $(CS_x)_n$, wherein x is a numerical value from 1.2 to 2.3 and n is a numerical value greater than or equal to 2, and most preferably greater than 20.

Poly(carbon disulfide) was prepared by reacting carbon disulfide with sodium metal in an appropriate solvent.

During the discharge of the cell, the PCS polymer is reduced. The reduction of PCS is accompanied by the insertion of Li$^+$ ions into the cathode from the electrolyte to maintain charge neutrality.

In either a lithium or sodium battery, the main design concerns are the kinetics and chemical and electrochemical reversibility of the reduction/oxidation, the density of available sulfur atoms, and the miscibility with the polymer electrolyte.

An advantage of using PCS as the cathode active material is the high density of sulfur atoms which results in a high density of charge-transfer electrons during oxidation-reduction. This is accompanied by a high density of Li$^+$ ions inserted for charge neutrality, resulting in a high capacity. In all PCS compounds used for the cathode of the invention the sulfur concentration is always greater than the carbon concentration.

Another advantage of using PCS as the cathode active material in solid state batteries is the absence of low molecular weight moieties produced during oxidation and reduction which may diffuse into the polymer electrolyte phase, particularly with gel electrolytes.

Figure 1:
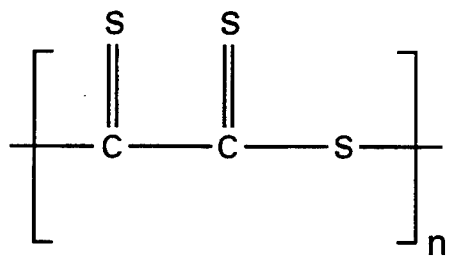
FIG. 1 shows schematically possible structures of poly(carbon disulfide). The polymer, as synthesized, is most likely a co-polymer of the structures shown in FIG. 1.
Figure 1:
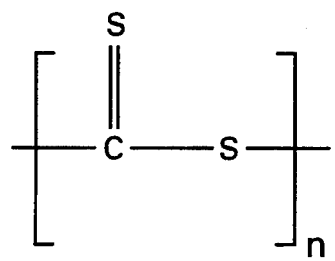

In contrast to the organo-sulfur materials developed by De Jonghe, et al. PCS does not undergo polymerization/de-polymerization upon charge and discharge, but maintains the integrity of the polymer backbone. The oxidation-reduction process involves instead the conjugated nature of the polymer. Although the detailed structure of PCS as synthesized has not yet been completely determined, it is assumed to be a co-polymer of the structures shown in FIG. 1.

Figure 2A:
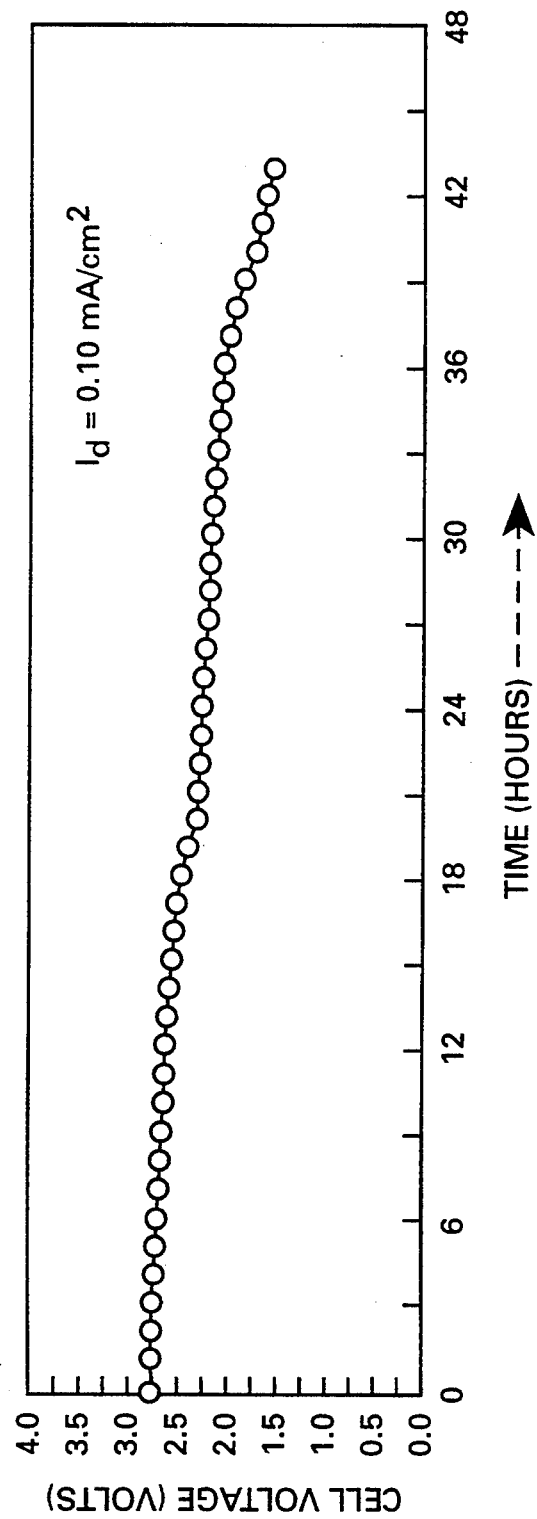
FIG. 2 shows the galvanostatic discharge profile of a thin film Li/PAN-LiClO$_4$-EC-PC/PCS battery as a function of time (a) and capacity (b) at a current density of 0.10 mA/cm$^2$.
Figure 2B:
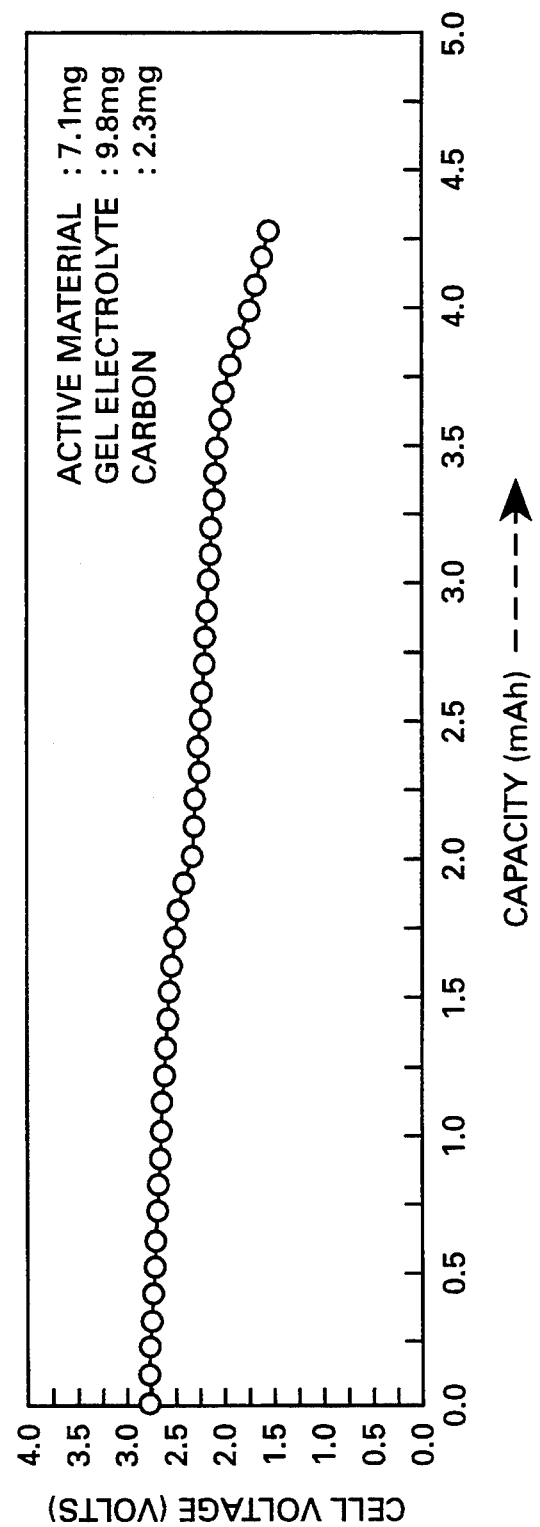

Thin film rechargeable lithium cells having a PCS based cathode have been made in a planar configuration. Their discharge capabilities, rechargeability and quick charge retention capabilities have been measured. Typical discharge characteristic curves for a Li/PCS cell with a gel electrolyte at 0.10 mA/cm$^2$ are shown in FIG. 2.

In an unoptimized Li/PCS cell, typically operating at 2.5 volts, about 650 Wh/kg can be achieved without any packing hardware. Long term reversibility at four C-rates were investigated by cycling 2.0 mAh cells in a planar sandwich cell at ambient temperature.

Figure 3:
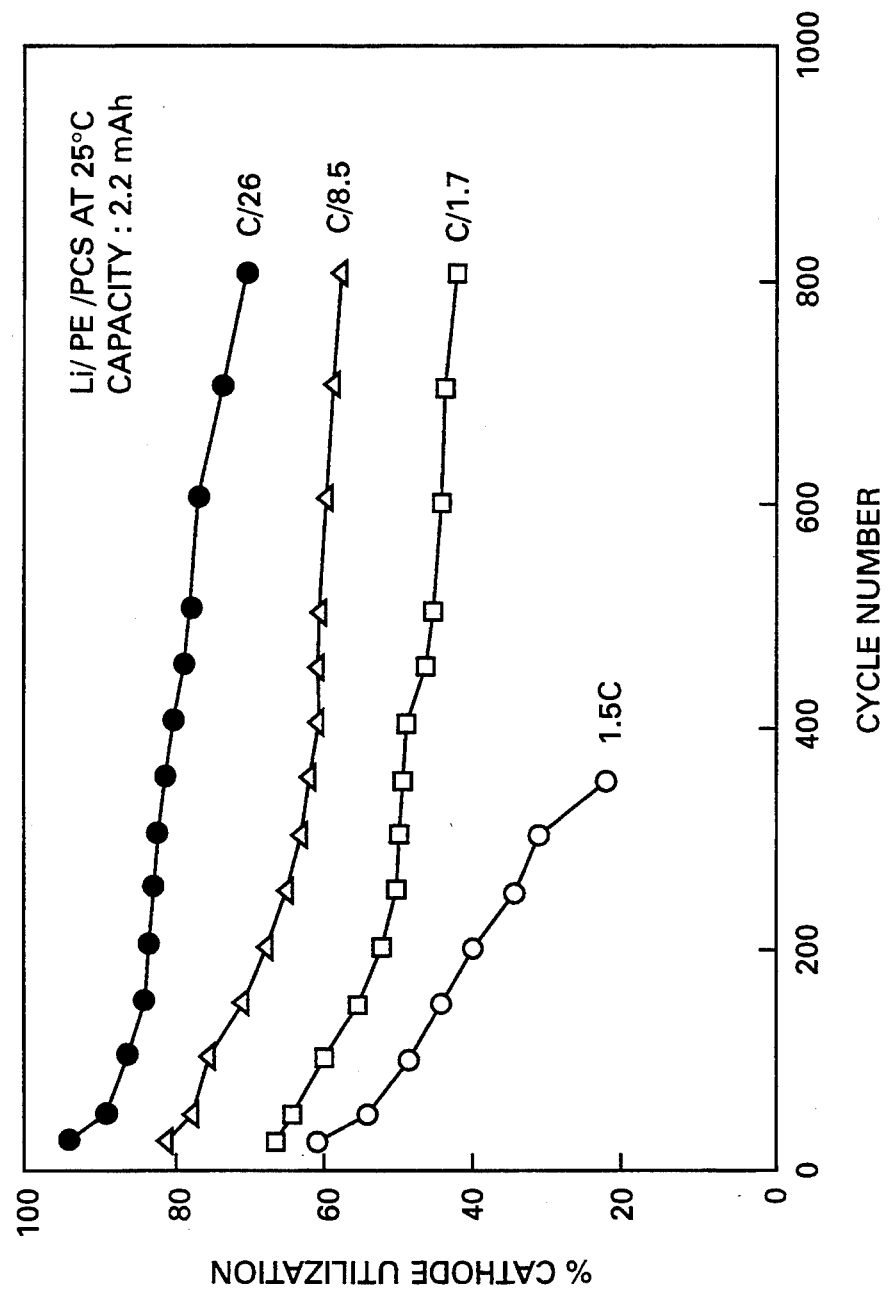
FIG. 3 shows the cathode utilization achieved upon cycling as different densities.

FIG. 3 illustrates the percentage of cathode utilization against the cycle number. The capacity calculations and cathode utilization numbers were calculated in a cycle interval of 25, until a capacity decline of 20% was observed. More than 800 cycles were achieved at low to moderate C-rates. This is in contrast to 200 cycles or less for organo-sulfur materials which are based on the mechanism of polymerization and de-polymerization [*J. Electrochem. Soc.*, Vol. 138, pp. 1891–1895 (1991)].

The charging efficiency of an electrical cell is defined as the ratio between charge output and charge input to the cell during one complete cycle. For the cell of the invention, the charging efficiency is close to unity until the 200th cycle. After about the 475th cycle, when the capacity of the cell declined by 5%, the battery cycling was disrupted to measure the cell impedance. A low cell impedance was observed which ruled out limitations under cathode/electrolyte interface. More importantly, a large life cycle was anticipated. The declining cathode capacity after 500 cycles was attributed to the possible formation of soft dendrites at the lithium anode-polymer electrolyte interface; therefore, these cells have been classified as anode performance limited battery systems.

In a separate experiment, cells with PCS-based cathodes, lithium foil anodes and poly(ethylene oxide)-LiClO$_4$ polymer electrolyte were cycled with change of lithium foil anode every 300 cycles in order to test the cycle life to the cathode. The experiment showed that PCS-based cathodes can be subjected to more than 2,500 cycles, or ten times longer than organo-sulfur materials which involve polymerization and de-polymerization [*J. Electrochem. Soc.*, Vol. 138, pp. 1891–1895 (1991)].

Figure 4:
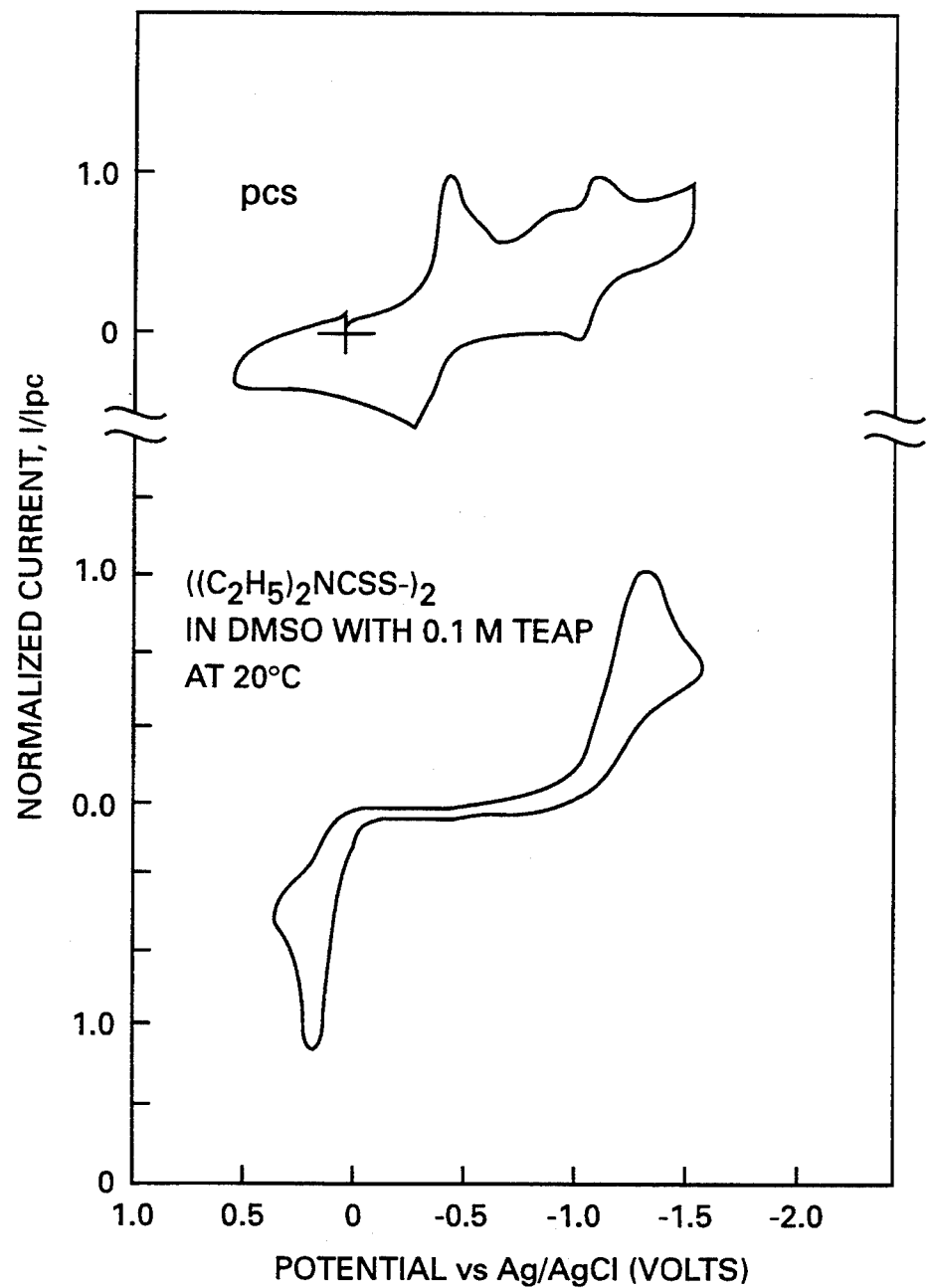
FIG. 4 shows cyclic voltammograms of PCS and $((C_2H_5)_2NCSS)_2$ in an electrolyte consisting of dimethylsulfoxide with 0.1 molar concentration of tetraethylammonium perchlorate.

The cyclic voltammograms shown in FIG. 4 illustrate the fundamental difference between PCS and organo-sulfur materials whose electrochemical activity is based on breaking and reforming of S—S bonds. In the case of PCS the oxidation and reduction peaks are closely aligned on the voltage axis, indicative of fast, reversible electrochemical kinetics expected from the oxidation and reduction of a conjugated system. In the case of $((C_2H_5)_2NCSS)_2$, which polymerizes and de-polymerizes by the forming and breaking of S—S bonds, respectively, during electrochemical oxidation and reduction, there is a spread of about 2 volts between the oxidation and the reduction peaks. This is indicative of slow kinetics associated with bond breaking and formation.

It is clear from these experimental results that PCS is a conjugated polymeric structure fundamentally different in its structure and electrochemical function compared with the materials developed by DeJonghe et al. This fundamental difference structurally and electronically is the cause for the substantially higher capacity and very much longer cycle life.

The polymer electrolyte used in the cell of the present invention is any polymer electrolyte which is chemically inert with respect to the anode and the cathode, and which permits the migration of ions between the anode and cathode.

Different polymer electrolyte systems which have application to both lithium and sodium based rechargeable batteries can be employed in the fabrication of the cell of the invention, such as solid polymer electrolytes; single-ion conducting polymer electrolytes and high conductivity gel polymer electrolytes. Liquid organic electrolytes are also useful electrolytes for the invention.

Single ion conducting polymer electrolytes have been synthesized with highly delocalized anionic moieties covalently attached to the polymer backbone to achieve high specific lithium ion conductivity, as described in U.S. Pat. No. 4,882,243 (1989). The advantages of polymer electrolytes with exclusive cation conduction are found in reduced cell polarization deriving from anion mobility, reduced volume changes in the cathode from intercalation of ion clusters and reduced salt-induced corrosion on the current collectors. Room temperature conductivities for single ion conducting polymer electrolytes described in U.S. Pat. No. 4,882,243 are in the range of $10^{-4}$ to $10^{-5}$ S/cm range.

Gel polymer electrolytes are also very effective polymer electrolyte systems. They include plasticizing agents in a polymer network. A substantial increase in lithium ion conductivity has been achieved by introducing ethylene carbonate ("EC") and propylene carbonate ("PC") plasticizer agents into polymers matrices.

Other useful plasticizing agents include N-methyl acetamide, sulfonate, sulfolane, 1,2-dimethoxyethane, poly(ethylene glycol) 1,3-dioxolane and glymes.

The plasticizing agents themselves are useful solvents to form liquid polymer electrolytes which provide other effective electrolyte systems for the cell of the invention. For example, mixtures of EC and PC with lithium salts, such as LiAsF$_6$, are useful liquid electrolytes.

Details of the preferred embodiments of the invention have been set forth herein in the form of examples which are described below. The full scope of the invention will be pointed out in the claims which follow the specification.

EXAMPLES

Preparation of Poly(carbone disulfide)

Example 1

1.7 g sodium (50% in paraffin) was washed with hexane. Sodium sand was added into 50 ml of DMSO and the solution was stirred until all the sodium dissolved (24 to 48 hours). Equal moles of carbon disulfide was then dropwise added into the DMSO and refluxed under nitrogen for 48 hrs. The sodium dicarbon disulfide salt is dissolved in water and acidified with 6N HCl. Upon acidification, dark brown precipitate fell out. The reaction mixture was stirred at room temperature for 24 hours. The solution was then concentrated to ¼ of its original volume. The precipitate was then separated and washed with water and acetone and ground with acetone in a mortar and pestle assembly and filtered. The yellow acetone portion of the solution was discarded and the procedure repeated until the acetone looked clear. the precipitate was then separated and dried in a vacuum oven at 50° C. for 24 hours.

Example 2

A 12 gram sample of sodium dispersion in xylene was added in small portions to an ice cooled mixture of 100 ml of $CS_2$ and 300 ml of methyl pyrolidinone and kept under nitrogen for 1 hour. After the addition was completed, the reaction mixture was stirred at room temperature for 2 days. The solvent was then removed under vacuum. The residue was dissolved in water and then acidified with 6N HCl. The hydrochloric acid aqueous layer was decanted and the residue was washed with water and then acetone. The residue was then dried under vacuum at 55° C. overnight. After cooling, the black material was ground with acetone in a mortar and pestle assembly and filtered. The powder was repeatedly stirred with acetone until the solution became a light yellow color. The yield of the poly(carbon disulfide) was about 40 g.

Preparation of Poly(carbon disulfide) Based Composite Cathode

Example 3

A mixture of 40% by weight PCS prepared following the general procedure of Example 1 or 2, 50% polyacrylonitrile and 10% acetylene black was dissolved in dimethylsulfoxide to form a slurry. The slurry was ground into fine particles and was then cast as a film 25–100 μm on a 25 μm thick nickel foil. The entire unit was dried in a vacuum oven at 40° C.–80° C. for 24 hours.

Example 4

A mixture of 40% by weight PCS, 45% by weight electrolyte and 15% acetylene black was dissolved in dimethylsulfoxide to form a slurry. The electrolyte could be polyethylene oxide, plus PC and EC and $LiCF_3SO_3$. The slurry was finally ground and then cast as a film onto a nickel foil. The entire unit was then dried in a vacuum oven at 40° C.–80° C. for 24 hours.

preparation of Rechargeable Batteries

Example 5

A rechargeable lithium battery of unipolar sandwich design was prepared by sandwiching a polymer electrolyte of about 25 μm thickness between a lithium foil of 125 μm thickness and a composite cathode of about 25–75 μm. To obtain laboratory prototype cells, the above components were sandwiched between two stainless steel circular disks having 0.5 cm thickness. A typical material used for the anode was lithium metal. The PCS of the invention prepared in accordance with the procedure of Examples 1 or 2 was used for the cathode. The electrolyte employed in preparing the battery of the invention was a branched polysiloxane containing ethylene oxide side chains and a $LiCF_3SO_3$ salt.

Example 6

Following the general procedure of Example 5, a rechargeable lithium polymer electrolyte battery was prepared, having the composite cathode of the invention, a lithium foil anode, 9.8 mg of polymer gel electrolyte and 2.3 mg of ultrafine graphite powder. The composite anode contained 7.1 mg of PCS.

The polymer gel electrolyte contained polyacrylonitrile, ethylene carbonate, propylene carbonate and $LiClO_4$ with a conductivity of $3 \times 10^{-3}$ S/cm at 25° C.

FIG. 2 shows the first galvanostatic discharge profile of the cell of the invention at ambient temperature. At 0.10 $mA/cm^2$ current density, a practical capacity of 4.4 mAh has been achieved with a cut-off voltage at 1.5 volts. This translates into 87% of practical cathode utilization at a storage energy of 8,800 mWh.

Example 7

Another rechargeable lithium cell was prepared having a composite cathode containing 5.4 mg of polymer gel electrolyte, 12.0 mg of active cathode material and 1.9 mg of graphite powder. Assuming a mid cell potential of 2.5 V, a storage energy of 12,600 mWh could be obtained.

The performance characteristics of the cells prepared in Examples 6 and 7 demonstrate that by using the cathode of the invention a very high cathode utilization is readily achieved resulting further in energy capacity storage much higher than those achieved by commercially available batteries.

Example 8

Rechargeable cells were prepared containing freestanding thin films of PCS-based composite cathodes. The cathodes contained 50% by weight of PCS, 40% by weight PAN, and 10% by weight acetylene black. FIG. 3 shows the practical cathode utilization achieved upon cycling at different current densities, assuming a 700 Ah/kg theoretical capacity. During the first few cycles, the percentage of utilization ranges from 60 to 86% at high to moderate C-rates. At low C-rates, only 8% loss in the cathode utilization was observed at the end of about 800 cycles. At low C-rates, the cycling efficiency of the cell is expected to be at least 2,500 cycles with a nominal capacity loss. At moderately high C-rates, there was an initial polarization during the first five cycles, which reduced the practical utilization by about 10–25%. Only a capacity decline of a maximum of 15% was observed at the end of 800 cycles. At high C rates, the capacity declined to 40% at the end of 400 cycles.

Example 9

A rechargeable lithium battery was prepared having a lithium foil of 125 μm thickness, a fiber reinforced 1M $LiClO_4$ in propylene carbonate/dimethyl ethoxide electrolyte and a PCS-based composite cathode. The cathode contained 50% by weight PCS, 40% by weight PAN, and 10% by weight acetylene black. The battery prepared for this example exhibited about 500 cycles with a maximum cathode capacity loss of 10% compared to the first cycle. The cells were subjected to a twenty minute quick discharge/charge cycle without any rest period by trial and error method to choose the appropriate voltage and current limits. The average material utilization during the first 200 cycles was 72% and about 60% between the 250th and 425th cycle. The cycle efficiency defined as the ratio between charge output (discharge) and charge input (charge) to the cell during one complete cycle is close to unity up to 200 cycles.

The results obtained in Examples 8 and 9 demonstrate that at ambient temperature the lithium Li/PCS cells of the invention can be cycled extensively with a minimum loss of capacity. Poly(carbon disulfide) based lithium polymer electrolyte rechargeable systems with 2.5 volt mid-cell potential have thus been successfully developed with a high energy density and long cycle life capability. The battery system of the invention, therefore, can be rated as an excellent rechargeable system with high energy density, long cycle life and an extremely long shelf-life.

We claim:

1. An electric current-producing cell, comprising:
   (a) a solid anode including an anode-active material selected from the group consisting of one of more alkali metals, a mixture of one or more alkali metals, one or more alkaline earth metals, lithium-aluminum alloys, sodium alloys and lithium or sodium intercalated carbon;
   (b) a composite cathode comprising a cathode-active material including a mixture of one or more conjugated, solid poly(carbon disulfide) polymers including

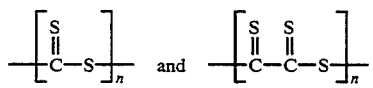

groups generically represented by the formula:

wherein x is from about 1.2 to about 2.3 and n is greater or equal to 2; and
   (c) an electrolyte containing an alkali metal salt, said electrolyte being chemically inert with respect to said anode and said cathode.

2. The cell of claim 1, wherein said poly(carbon disulfide) polymers do not undergo polymerization and de-polymerization during oxidation and reduction.

3. The cell of claim 1, wherein n is greater than 20.

4. The cell of claim 1, wherein said alkali metal salt is selected from the group consisting of $MClO_4$, $MSO_3CF_3$, $MBF_4$, $MAsF_6$, $MN(SO_2CF_3)_2$, $MPF_6$,

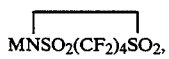

and $MC(SO_2CF_3)_3$, where M is Li or Na.

5. The cell of claim 1, wherein said electrolyte is a polymer electrolyte or a liquid organic electrolyte.

6. The cell of claim 5, wherein said polymer electrolyte is selected from the group consisting of solid polymer electrolytes, single-ion conducting polymer electrolytes, and gel polymer electrolytes.

7. The cell of claim 5, wherein said solid polymer electrolyte is a lithium or sodium ion conducting polymer having a polysiloxane backbone.

8. The cell of claim 6, wherein said gel polymer electrolyte further comprises gel-forming agents selected from the group consisting of propylene carbonate, ethylene carbonate, N-methyl acetamide, sulfonates, sulfolanes, poly(ethylene glycol), 1,2-diamethoxy-ethane, 1,3-dioxolane and glymes.

9. A method of preparing a composite cathode which comprises:

coating a cathode substrate with a mixture comprising an effective amount of conjugated, solid poly(carbon disulfide) polymers including

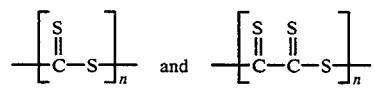

groups generically represented by the formula:

wherein x is from about 1.2 to about 2.3 and n is greater or equal to 2;, an effective amount of polymer electrolyte and an effective amount of conducting carbon.

10. A method of forming a solid state rechargeable cell which comprises:
    (a) providing a solid anode formed from material selected from the group consisting of one or more alkali metals, a mixture of one or more alkali metals, one or more alkaline earth metals, lithium-aluminum alloys, sodium alloys, and lithium or sodium intercalated carbon;
    (b) providing a composite cathode which comprises a cathode-active material including a mixture of one or more conjugated, solid poly(carbon disulfide) polymers including

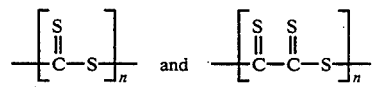

groups generically represented by the formula:

wherein x is from about 1.2 to about 2.3 and n is greater or equal to 2;
    (c) enclosing an electrolyte between said anode and said cathode.

11. The method of claim 10, wherein said poly(carbon disulfide) compounds do not undergo polymerization and de-polymerization during oxidation and reduction.

12. The method of claim 10, wherein n is greater than 20.

13. The method of claim 10, wherein said alkali metal salt is selected from the group consisting of $MClO_4$, $MSO_3CF_3$, $MBF_4$, $MAsF_6$, $MN(SO_2CF_3)_2$, $MPF_6$,

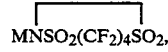

and $MC(SO_2CF_3)_3$, where M is Li on Na.

14. The method of claim 10, wherein said electrolyte is a polymer electrolyte or a liquid organic electrolyte.

15. The cell of claim 14, wherein said polymer electrolyte is selected from the group consisting of solid polymer electrolytes, single-ion conducting polymer electrolytes, and gel polymer electrolytes.

16. The cell of claim 14, wherein said polymer electrolyte is a lithium or sodium ion conducting polymer having a polysiloxane backbone.

* * * * *